United States Patent
Fontanella et al.

(10) Patent No.: US 7,620,815 B2
(45) Date of Patent: Nov. 17, 2009

(54) CREDENTIAL PRODUCTION USING A SECURED CONSUMABLE SUPPLY

(75) Inventors: D. Alan Fontanella, Plymouth, MN (US); Gary M. Klinefelter, Eden Prairie, MN (US); Jeffrey D. Upin, Edina, MN (US); John E. Ekers, Plymouth, MN (US); Thomas C. Platner, Eden Prairie, MN (US); Kelly R. Nehowig, Maple Grove, MN (US); Angela Marie Goldenstein, Crystal, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 200 days.

(21) Appl. No.: 11/261,450

(22) Filed: Oct. 28, 2005

(65) Prior Publication Data
US 2006/0123471 A1 Jun. 8, 2006

Related U.S. Application Data

(63) Continuation-in-part of application No. 10/372,011, filed on Feb. 21, 2003, now Pat. No. 7,430,762.

(60) Provisional application No. 60/668,257, filed on Apr. 5, 2005, provisional application No. 60/623,622, filed on Oct. 29, 2004.

(51) Int. Cl.
H04L 9/32 (2006.01)
(52) U.S. Cl. .................... 713/175; 713/173
(58) Field of Classification Search ............ 713/173, 713/175, 179
See application file for complete search history.

(56) References Cited

U.S. PATENT DOCUMENTS

| 3,193,430 | A | 7/1965 | Messmer et al. ............ 156/355 |
| 3,446,415 | A | 5/1969 | Bromley ...................... 229/30 |
| 3,761,079 | A | 9/1973 | Azure, Jr. .................... 271/41 |
| 3,887,106 | A | 6/1975 | Charlson et al. ............ 221/197 |
| 3,889,472 | A | 6/1975 | Guillaud ...................... 60/698 |
| 3,960,072 | A | 6/1976 | Ahlgren et al. ............... 101/35 |

(Continued)

FOREIGN PATENT DOCUMENTS

DE 25 35 699 A1 3/1977

(Continued)

OTHER PUBLICATIONS

Office Communication for U.S. Appl. No. 10/937,739, filed Sep. 9, 2004, date of mailing Nov. 22, 2005.

(Continued)

*Primary Examiner*—Gilberto Barron, Jr.
*Assistant Examiner*—Venkat Perungavoor
(74) *Attorney, Agent, or Firm*—Leanne Taveggia Farrell; Westman, Champlin & Kelly, P.A.

(57) ABSTRACT

A method and system for securely processing a credential substrate using a credentials production system and secured consumable supply. The consumable supply is selectively in one of a plurality of states including a production disabled state and a production enabled state. The state of the consumable supply is changed from the production disabled state to the production enabled state. The state in the consumable supply is verified as being in the production enabled state prior to processing the credential substrate using the consumable supply.

19 Claims, 5 Drawing Sheets

U.S. PATENT DOCUMENTS

| | | | |
|---|---|---|---|
| 4,021,032 A | 5/1977 | Gross et al. | 271/166 |
| 4,068,028 A | 1/1978 | Samonides | 428/40 |
| 4,146,900 A | 3/1979 | Arnold | 346/75 |
| 4,179,732 A | 12/1979 | Khan et al. | 364/200 |
| 4,282,583 A | 8/1981 | Khan et al. | 364/900 |
| 4,313,683 A | 2/1982 | Brown et al. | 400/225 |
| 4,393,386 A | 7/1983 | Di Giulio | 346/75 |
| 4,471,885 A | 9/1984 | Mucciarone | 221/155 |
| 4,534,313 A | 8/1985 | Louvel | 118/696 |
| 4,604,631 A | 8/1986 | Jinnai et al. | 346/1.1 |
| 4,617,080 A | 10/1986 | Kobayashi et al. | 156/359 |
| 4,680,596 A | 7/1987 | Logan | 346/140 |
| 4,685,702 A | 8/1987 | Kazuharu | 283/81 |
| 4,686,540 A | 8/1987 | Leslie et al. | 346/33 |
| 4,716,346 A | 12/1987 | Matsuo | 318/38 |
| 4,719,626 A | 1/1988 | Ogasawara | 371/16 |
| 4,734,868 A | 3/1988 | DeLacy | 364/519 |
| 4,750,743 A | 6/1988 | Nicoletti | 273/148 |
| 4,781,985 A | 11/1988 | Desjarlais | 428/421 |
| 4,827,425 A | 5/1989 | Linden | |
| 4,864,618 A | 9/1989 | Wright et al. | 380/51 |
| 4,938,830 A | 7/1990 | Cannistra | 156/270 |
| 4,961,088 A | 10/1990 | Gilliland et al. | 355/206 |
| 5,018,614 A | 5/1991 | Ruckert | 194/236 |
| 5,025,399 A | 6/1991 | Wendt et al. | |
| 5,027,135 A | 6/1991 | Negishi et al. | 346/154 |
| 5,161,233 A | 11/1992 | Matsuo et al. | 355/218 |
| 5,184,181 A | 2/1993 | Kurando et al. | 355/260 |
| 5,238,524 A | 8/1993 | Seki et al. | 156/538 |
| 5,266,968 A | 11/1993 | Stephenson | 346/76 |
| 5,267,800 A | 12/1993 | Petteruti et al. | 400/88 |
| 5,277,501 A | 1/1994 | Tanaka et al. | 400/120 |
| 5,290,067 A | 3/1994 | Langen | 283/60.1 |
| 5,318,369 A | 6/1994 | Ishii | 400/249 |
| 5,318,370 A | 6/1994 | Nehowig | 400/613 |
| 5,326,179 A | 7/1994 | Fukai et al. | 400/120 |
| 5,327,201 A | 7/1994 | Coleman et al. | 355/278 |
| 5,368,677 A | 11/1994 | Ueda et al. | 156/362 |
| 5,373,146 A | 12/1994 | Lei | 235/382.5 |
| 5,378,884 A | 1/1995 | Lundstrom et al. | 235/441 |
| 5,410,642 A | 4/1995 | Hakamatsuka et al. | 395/113 |
| 5,412,779 A | 5/1995 | Motoyama | 395/275 |
| 5,413,532 A | 5/1995 | Raby | 462/2 |
| 5,437,960 A | 8/1995 | Negate et al. | 430/256 |
| 5,441,921 A | 8/1995 | Verdonck et al. | 503/227 |
| 5,455,611 A | 10/1995 | Simon et al. | 347/49 |
| 5,466,319 A | 11/1995 | Zager et al. | 156/220 |
| 5,484,502 A | 1/1996 | Bozanic | 156/235 |
| 5,516,218 A | 5/1996 | Amano et al. | 400/535 |
| 5,534,857 A | 7/1996 | Laing et al. | |
| 5,537,554 A | 7/1996 | Motoyama | 395/280 |
| 5,544,289 A | 8/1996 | Motoyama | 395/280 |
| 5,550,735 A | 8/1996 | Slade et al. | 364/401 |
| 5,550,984 A | 8/1996 | Gelb | 395/200.17 |
| 5,552,994 A | 9/1996 | Cannon et al. | 364/468.01 |
| 5,558,449 A | 9/1996 | Morgavi | 400/188 |
| 5,568,618 A | 10/1996 | Motoyama | 395/280 |
| 5,573,621 A | 11/1996 | Boreali | 156/256 |
| 5,617,528 A | 4/1997 | Stechmann et al. | |
| 5,630,581 A | 5/1997 | Rodesch | 271/23 |
| 5,637,174 A | 6/1997 | Field et al. | 156/256 |
| 5,646,388 A | 7/1997 | D'Entremont et al. | 235/380 |
| 5,649,120 A | 7/1997 | Motoyama | 395/280 |
| 5,673,076 A | 9/1997 | Nardone et al. | 347/171 |
| 5,688,056 A * | 11/1997 | Peyret | 400/61 |
| 5,695,589 A | 12/1997 | German et al. | 156/250 |
| 5,709,484 A | 1/1998 | Dorner | 400/188 |
| 5,709,485 A | 1/1998 | Kohno | 400/208 |
| 5,715,381 A | 2/1998 | Hamilton | 395/114 |
| 5,717,776 A | 2/1998 | Watanabe | 382/116 |
| 5,727,137 A | 3/1998 | LeClair et al. | 375/116 |
| 5,745,036 A | 4/1998 | Clare | 340/572 |
| 5,758,184 A | 5/1998 | Lucovsky et al. | 395/826 |
| 5,768,143 A | 6/1998 | Fujimoto | 364/479 |
| 5,768,483 A | 6/1998 | Maniwa et al. | 395/114 |
| 5,768,495 A | 6/1998 | Campbell et al. | 395/183.01 |
| 5,771,058 A | 6/1998 | Kobayashi | 347/218 |
| 5,771,071 A | 6/1998 | Bradley et al. | 348/335 |
| 5,771,382 A | 6/1998 | Wang et al. | 395/670 |
| 5,774,678 A | 6/1998 | Motoyama | 395/280 |
| 5,783,024 A | 7/1998 | Forkert | 156/351 |
| 5,785,224 A | 7/1998 | Nowakowski | 225/4 |
| 5,790,162 A | 8/1998 | Adams et al. | 347/222 |
| 5,796,420 A | 8/1998 | Kaerts et al. | 347/188 |
| 5,805,810 A | 9/1998 | Maxwell | 395/200.36 |
| 5,807,461 A | 9/1998 | Hagstrom | 156/361 |
| 5,819,110 A | 10/1998 | Motoyama | 395/835 |
| 5,822,534 A | 10/1998 | Yamunachari et al. | 395/200.54 |
| 5,828,567 A | 10/1998 | Eryurek et al. | 364/184 |
| 5,835,911 A | 11/1998 | Nakagawa et al. | 707/203 |
| 5,837,991 A | 11/1998 | LaManna et al. | 235/475 |
| 5,850,901 A | 12/1998 | Schuster et al. | 198/370.05 |
| 5,860,068 A | 1/1999 | Cook | 705/26 |
| 5,862,260 A | 1/1999 | Rhoads | 382/232 |
| 5,873,606 A | 2/1999 | Haas et al. | 283/75 |
| 5,874,145 A | 2/1999 | Waller | 428/42.1 |
| 5,884,014 A | 3/1999 | Huttenlocher et al. | 395/114 |
| 5,886,334 A | 3/1999 | D'Entremont et al. | 235/380 |
| 5,887,216 A | 3/1999 | Motoyama | 399/8 |
| 5,889,866 A | 3/1999 | Cyras et al. | 380/49 |
| 5,889,941 A | 3/1999 | Tushie et al. | |
| 5,936,542 A | 8/1999 | Kleinrock et al. | 340/825.34 |
| 5,941,414 A | 8/1999 | Kasper | 221/210 |
| 5,941,522 A | 8/1999 | Hagstrom et al. | 271/225 |
| 5,962,832 A | 10/1999 | Dorner | 235/380 |
| 5,973,692 A | 10/1999 | Knowlton et al. | 345/348 |
| 5,980,011 A | 11/1999 | Cummins et al. | 347/4 |
| 6,014,748 A | 1/2000 | Tushie et al. | |
| 6,022,429 A | 2/2000 | Hagstrom | 156/64 |
| 6,033,832 A | 3/2000 | Wingender | 430/373 |
| 6,070,146 A | 5/2000 | Mimata | 705/13 |
| 6,100,804 A | 8/2000 | Brady et al. | 340/572.7 |
| 6,182,136 B1 | 1/2001 | Ramanathan et al. | 709/224 |
| 6,189,103 B1 | 2/2001 | Nevarez et al. | 713/201 |
| 6,196,459 B1 | 3/2001 | Goman et al. | 235/380 |
| 6,199,753 B1 | 3/2001 | Tracy et al. | 235/375 |
| 6,219,669 B1 | 4/2001 | Haff et al. | 707/10 |
| 6,220,511 B1 | 4/2001 | Holec et al. | 235/380 |
| 6,233,683 B1 | 5/2001 | Chan et al. | 713/172 |
| 6,272,472 B1 | 8/2001 | Danneels et al. | 705/27 |
| 6,292,092 B1 | 9/2001 | Chow et al. | 340/5.6 |
| 6,298,336 B1 | 10/2001 | Davis et al. | 705/41 |
| 6,335,799 B1 | 1/2002 | Provost | 358/1.4 |
| 6,367,011 B1 | 4/2002 | Lee et al. | |
| 6,380,965 B1 | 4/2002 | Sims et al. | 347/218 |
| 6,386,772 B1 | 5/2002 | Klinefelter et al. | 400/208 |
| 6,412,991 B1 | 7/2002 | Klinefelter et al. | 400/240 |
| 6,497,469 B1 | 12/2002 | Shinada et al. | |
| 6,554,512 B2 | 4/2003 | Heno et al. | 400/625 |
| 6,582,141 B2 | 6/2003 | Meier et al. | 400/701 |
| 6,584,564 B2 | 6/2003 | Olkin et al. | 713/152 |
| 6,629,134 B2 | 9/2003 | Hayward et al. | 709/217 |
| 6,631,967 B1 | 10/2003 | Saruta | 347/19 |
| 6,632,250 B1 | 10/2003 | Lynch et al. | |
| 6,633,405 B1 | 10/2003 | Nguyen | 358/1.16 |
| 6,644,771 B1 | 11/2003 | Silverbrook | 347/19 |
| 6,647,871 B2 | 11/2003 | Morand | 101/33 |
| 6,650,430 B2 | 11/2003 | Francis et al. | 385/1.14 |
| 6,662,999 B1 | 12/2003 | Vancour et al. | |
| 6,663,100 B2 | 12/2003 | Crowley | 271/165 |
| 6,668,322 B1 | 12/2003 | Wood et al. | 713/182 |
| 6,694,884 B2 | 2/2004 | Klinefelter et al. | 101/484 |
| 6,695,205 B1 | 2/2004 | Lundstrom et al. | |
| 6,702,282 B2 | 3/2004 | Pribula et al. | 271/272 |

| | | | |
|---|---|---|---|
| 6,711,678 B2 | 3/2004 | Ferguson | 713/513 |
| 6,732,101 B1 | 5/2004 | Cook | 707/10 |
| 6,732,148 B1 | 5/2004 | Estrada et al. | 709/205 |
| 6,738,903 B1 | 5/2004 | Haines | 713/168 |
| 6,758,616 B2 | 7/2004 | Pribula et al. | 400/624 |
| 6,783,067 B2 | 8/2004 | Kreuter et al. | |
| 6,788,800 B1 | 9/2004 | Carr et al. | 382/100 |
| 6,792,544 B2 | 9/2004 | Hashem et al. | 713/201 |
| 6,802,586 B2 | 10/2004 | Forman | 347/19 |
| 6,816,968 B1 | 11/2004 | Walmsley | 713/168 |
| 6,826,609 B1 | 11/2004 | Smith et al. | 709/225 |
| 6,850,900 B1 | 2/2005 | Hare et al. | 705/26 |
| 6,850,911 B1 | 2/2005 | Huether | 705/51 |
| 6,856,975 B1 | 2/2005 | Inglis | 705/51 |
| 6,902,107 B2 | 6/2005 | Shay et al. | |
| 6,929,413 B2 | 8/2005 | Schofield | 400/103 |
| 6,932,527 B2 | 8/2005 | Pribula et al. | 400/621 |
| 6,985,167 B2 | 1/2006 | Lien | 347/171 |
| 6,997,629 B2 | 2/2006 | Bungert et al. | 400/613 |
| 7,070,100 B2 | 7/2006 | Davie et al. | |
| 7,107,836 B2 | 9/2006 | Brookner | |
| 7,128,408 B2 | 10/2006 | Kosugi | |
| 2001/0053947 A1 | 12/2001 | Lenz et al. | 700/23 |
| 2002/0072998 A1 | 6/2002 | Haines et al. | 709/200 |
| 2002/0116301 A1 | 8/2002 | Chapman et al. | 705/28 |
| 2002/0180993 A1 | 12/2002 | Klinefelter et al. | 358/1.15 |
| 2003/0028766 A1 | 2/2003 | Gass et al. | 713/164 |
| 2003/0046171 A1 | 3/2003 | Whale | 705/26 |
| 2003/0059050 A1 | 3/2003 | Hohberger et al. | 713/168 |
| 2003/0139973 A1 | 7/2003 | Claremont et al. | 705/26 |
| 2003/0167213 A1 | 9/2003 | Jammes et al. | 705/26 |
| 2003/0182587 A1 | 9/2003 | Morrison et al. | 713/182 |
| 2003/0216826 A1 | 11/2003 | Klinefelter | 705/65 |
| 2004/0046821 A1 | 3/2004 | Kosugi | |
| 2004/0109715 A1 | 6/2004 | Meier et al. | 400/208 |
| 2005/0006460 A1 | 1/2005 | Kreuter | 235/380 |
| 2005/0060239 A1 | 3/2005 | Holland et al. | 705/26 |
| 2005/0240498 A1* | 10/2005 | Thaler | 705/29 |
| 2005/0257253 A1 | 11/2005 | Ekers | 713/201 |
| 2006/0146081 A1 | 7/2006 | Vandermeulen et al. | |
| 2006/0191022 A1 | 8/2006 | Hohberger et al. | |
| 2006/0279588 A1 | 12/2006 | Yearworth et al. | |

FOREIGN PATENT DOCUMENTS

| | | |
|---|---|---|
| DE | 196 44 306 A1 | 5/1998 |
| EP | 0 195 104 A1 | 9/1986 |
| EP | 0 278 517 A2 | 8/1988 |
| EP | 0 562 979 A2 | 9/1993 |
| EP | 0 562 979 A3 | 9/1993 |
| EP | 0 597 135 A1 | 5/1994 |
| EP | 0 659 588 A2 | 6/1995 |
| EP | 0 887 197 A2 | 12/1998 |
| EP | 0 924 597 A2 | 6/1999 |
| EP | 0 887 197 A3 | 5/2000 |
| EP | 1 488 303 B1 | 3/2003 |
| FR | 2 667 416 | 4/1992 |
| GB | 2 120 821 A | 12/1983 |
| JP | 8-187921 A | 7/1996 |
| JP | 2001-24838 | 1/2001 |
| JP | 2001-215231 | 8/2001 |
| WO | WO 86/07480 | 12/1986 |
| WO | WO 95/09084 | 4/1995 |
| WO | WO 96/39656 | 12/1996 |
| WO | WO 98/51508 | 11/1998 |
| WO | WO 98/52762 | 11/1998 |
| WO | WO 99/21713 | 5/1999 |
| WO | WO 99/49379 | 9/1999 |
| WO | WO 00/43932 | 7/2000 |
| WO | WO 03/019459 A3 | 3/2003 |
| WO | WO 03/059632 | 7/2003 |
| WO | WO 03/060811 A2 | 7/2003 |
| WO | WO 03/079168 A2 | 9/2003 |
| WO | WO 03/079168 A3 | 9/2003 |
| WO | WO 2004/011268 A1 | 2/2004 |
| WO | WO 2004/027715 A2 | 4/2004 |

OTHER PUBLICATIONS

U.S. Appl. No. 11/232,427, filed Sep. 21, 2005 entitled "Prevention of Unauthorized Credential Production in a Credential Production System".

U.S. Appl. No. 60/611,614, filed Sep. 21, 2004 entitled "Challenge-Response Security Feature, Incomplete Print Job Processing Prevention and Print Job Encryption".

U.S. Appl. No. 60/668,257, filed Apr. 5, 2005 entitled "Print Consumable Security".

U.S. Appl. No. 60/623,622, filed Oct. 29, 2004 entitled "Ribbon Print Security Tracking".

U.S. Appl. No. 60/373,967, filed Apr. 19, 2002 entitled "Identification Card Manufacturing Device Having Secure Media".

Office Communication for U.S. Appl. No. 10/372,011, filed Feb. 21, 2003. Date of mailing: Oct. 18, 2005.

OrdaCard announces new Internet based high volume secured photo ID card production services, Oct. 1998, Business Wire, Inc.

DataCard Debuts Image and Data Retrieval Software for Enterprise Applications, Apr. 1998, Business Wire, Inc.

www.SmartIDCard.com, Jul. 2002, 4 pages, "Card Printing Service", 5 pages, Smart ID Card—Card Printing Services, ID Cards, Card Supplies, Smart Card Solutions.

Anon, "Instantly Re-Order Toner Cartridges Online Using HP's Smartchip," M2 Presswire, Oct. 19, 2001, 2 pages.

Office Communication for U.S. Appl. No. 10/647,666, filed Aug. 25, 2003, date of mailing: Sep. 15, 2004.

International Search Report for International Application No. PCT/US 03/06187, filed Feb. 28, 2003. Search Report date of Jul. 18, 2003.

Office Communication for U.S. Appl. No. 10/372,071, filed Feb. 21, 2003. Date of Mailing Feb. 15, 2005.

Office Communication for U.S. Appl. No. 10/937,739, filed Sep. 9, 2004, date of mailing Apr. 26, 2005.

UbiQ Smart Card Software Makes New FARGO Printers Complete Card-Issuance Systems Issuers Can Print and Personalize Smart Cards Using Pro Series ID Card Printers Combined with Ubiq's Personalization Software, Apr. 1998.

Office Action dated Apr. 18, 2006 for U.S. Appl. No. 10/372,011, filed Feb. 21, 2003.

Final Office Action dated Dec. 6, 2006 from U.S. Appl. No. 10/372,011, filed Feb. 21, 2003.

International Search Report and Written Opinion dated Nov. 30, 2006 from PCT Application No. PCT/ US2005/15176, filed May 3, 2005.

Office Action dated Oct. 14, 2004 from U.S. Appl. No. 10/126,441, filed Apr. 19, 2002.

Office Action dated Apr. 6, 2006 from U.S. Appl. No. 10/176,096, filed Jun. 20, 2002.

Office Action dated Jul. 27, 2006 from U.S. Appl. No. 10/126,428, filed Apr. 19, 2002.

Stone, H. S., Microcomputer Interfacing, Addison-Wesley, pp. 1-2, 1982.

* cited by examiner

CREDENTIAL PRODUCTION USING A SECURED CONSUMABLE SUPPLY

The present application claims the benefit of U.S. provisional patent application Ser. Nos. 60/623,622 filed Oct. 29, 2004 and 60/668,257, filed Apr. 5, 2005; and is a continuation-in-part of U.S. patent application entitled "IDENTIFICATION CARD MANUFACTURING SECURITY", Ser. No. 10/372,011, filed Feb. 21, 2003, all of which are hereby incorporated by reference in their entirety.

FIELD OF THE INVENTION

The present invention is generally directed to a credential production system. More particularly, the present invention is directed to methods and components for processing a secure credential substrate using a credential production system.

BACKGROUND OF THE INVENTION

Credentials include identification cards, driver's licenses, passports, and other valuable documents. Such credentials are formed from credential substrates including paper substrates, plastic substrates, cards and other materials. Such credentials generally include printed information, such as a photo, account numbers, identification numbers, and other personal information that is printed on the credential substrates using a print consumable, such as ink and ribbon. A secure overlaminate or security label may also be laminated to the surfaces of the credential substrate to protect the printed surfaces from damage or provide a security feature (e.g., hologram). Additionally, credentials can include data that is encoded in a smartcard chip, a magnetic stripe, or a barcode, for example.

Credential manufacturing systems or credential production systems generally include at least one credential processing device that processes a credential substrate to perform at least one step in forming the final credential product. Such credential processing devices include, for example, printing devices for printing images to the credential substrate, laminating devices for laminating an overlaminate to the credential substrate, devices for attaching labels, and encoding devices for encoding data to the substrate.

Credential production devices process a credential substrate in response to a credential processing job generated by a credential producing application. The credential processing job generally defines the printing, laminating, attaching and/or encoding processes that are to be performed by the credential manufacturing device on the credential substrate.

There is a great demand for generating credentials that include security features that are designed to prevent counterfeiting. In one example, printed credentials, such as identification cards, can be laminated with an overlaminate that includes custom security markings, such as holograms, which cannot be easily duplicated. Also, credentials can include special layers of materials that reveal attempts to tamper with the credential. Similar to lamination, security labels can be attached with or without heating There is also a great demand to prevent the unauthorized use of credential manufacturing systems to produce unauthorized credentials. In one example, the consumable supplies (e.g., print ribbon, overlaminate supply, label supply, substrate supply, etc.) that are required to produce the consumable are customized for limited use with only specifically authorized credential production devices, such as disclosed in U.S. Patent Publication No. 2003/0216826 assigned to Fargo Electronics, Inc. of Eden Prairie, Minn. Such a limitation on the use of the customized supplies can prevent a counterfeiter from seizing the supplies and using them with an unauthorized credential production device to produce counterfeit credentials.

While such customized supplies can provide a sound defense to counterfeiting by those who do not have access to the credential manufacturing system that is authorized for use with the stolen customized credentials, the customized supplies cannot prevent unauthorized credential production from those that have access to the authorized credential manufacturing system. Thus, for example, an employee of a company who has access to both the customized supplies and the corresponding authorized credential manufacturing system could potentially make an unauthorized credential.

Embodiments of the present invention provide solutions to these and other problems, and offer other advantages over the prior art.

SUMMARY OF THE INVENTION

The present invention is directed to a secured consumable supply. The consumable supply includes a consumable material and a programmable memory. The programmable memory is selectively encoded to indicate a production enabled state and a production disabled state. The consumable supply is usable with a credential production device when the memory indicates the production enabled state. The consumable supply is not allowed to be used with the credential production device when the memory indicates the production disabled state.

A credential production system is used to process a credential substrate using the consumable supply. The credential production system includes a credential production device. The credential processing device is configured to process the credential substrate using the consumable supply. The credential processing device also includes a controller that is configured to allow the processing of the credential substrate when the programmable memory of the consumable supply indicates the production enabled state. The credential processing device is also configured to prevent the processing of the credential substrate when the programmable memory of the consumable supply indicates the production disabled state.

To securely process a credential substrate using a credential production system the present invention also includes a method. The method includes providing a consumable supply that is selectively in one of a plurality of states including a production enabled state and a production disabled state. The state of the consumable supply is changed from the production disabled state to the production enabled state. The state of the consumable supply is verified as being in the production enabled state. The credential substrate is processed using the consumable supply if the consumable supply is in the production enabled state.

DETAILED DESCRIPTION OF THE PREFERRED EMBODIMENTS

The present invention includes the secure production, issuance or manufacture of valuable documents. Such valuable documents include, for example, credentials, such as identification badges, loyalty cards, financial bank cards, phone cards, healthcare cards, passports, birth certificates or other printed documents where secure issuance is desire. The present invention specifically includes the secure production, issuance or manufacture of a document through the control of a consumable supply.

Figure 1:
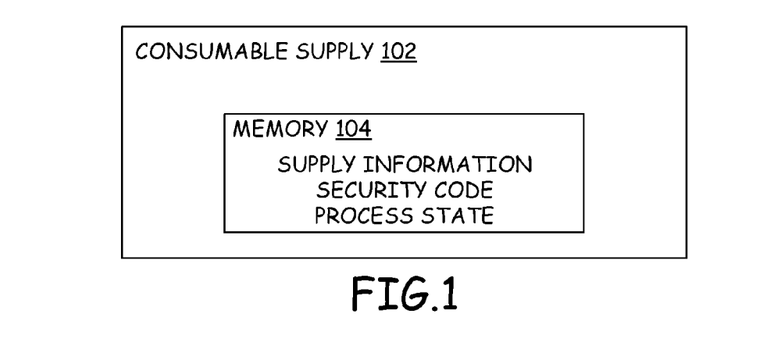
FIG. 1 is a simplified block diagram of a consumable supply.

FIG. 1 illustrates a schematic diagram of a consumable supply 102 in accordance with an embodiment of the present invention. Exemplary consumable supplies include a supply of credential substrates (e.g., a cartridge or hopper containing the substrates), a print consumable (e.g. ink or dye contained in a ribbon or cartridge) for application to the substrate, an overlaminate supply, a security label, and other types of consumable supplies. Consumable supply 102 includes consumable material and a programmable memory 104. Programmable memory can be a radio frequency identification (RFID) tag or chip, a contact memory chip or other alternate technology that allows reading and writing memory located in the supply. Programmable memory 104 is configured to store supply information. For example, supply information can include a product identifier such as a serial number, a security code or other related security information such as a security key or encryption key, the current process state of the secure consumable material, the consumed or remaining count of the consumable which is contained in the consumable material, an identification of the dealer of the consumable material and other related inventory information. The present invention provides a consumable supply that is selectively in one of a plurality of states. The process states of consumable supply 102 are discussed in detail with respect to FIGS. 3-6. Supply information can be written to and read from programmable memory 104 in accordance with conventional techniques. For example, programmable memory 104 can be a radio frequency identification (RFID) tag, bar code and etc.

The consumable material in the consumable supply used to produce, issue or manufacture valuable documents includes, for example, substrates, print consumables, overlaminate materials, security labels, and other types consumable materials. Substrates form the core of the document. Example substrates include cards, paper and etc. Print consumables include print material that is applied to substrates. Example print consumables include ribbon, ribbon cartridges, ink cartridges and etc. Overlaminate materials include materials that are applied to surfaces of the substrates. Example overlaminate materials include holograms, optically variable device (OVD) printed images and etc. Security Labels include adhesive labels and labels that are applied by a hot stamp. Similar to overlaminate materials these labels include holograms and OVD devices for security.

Figure 2:
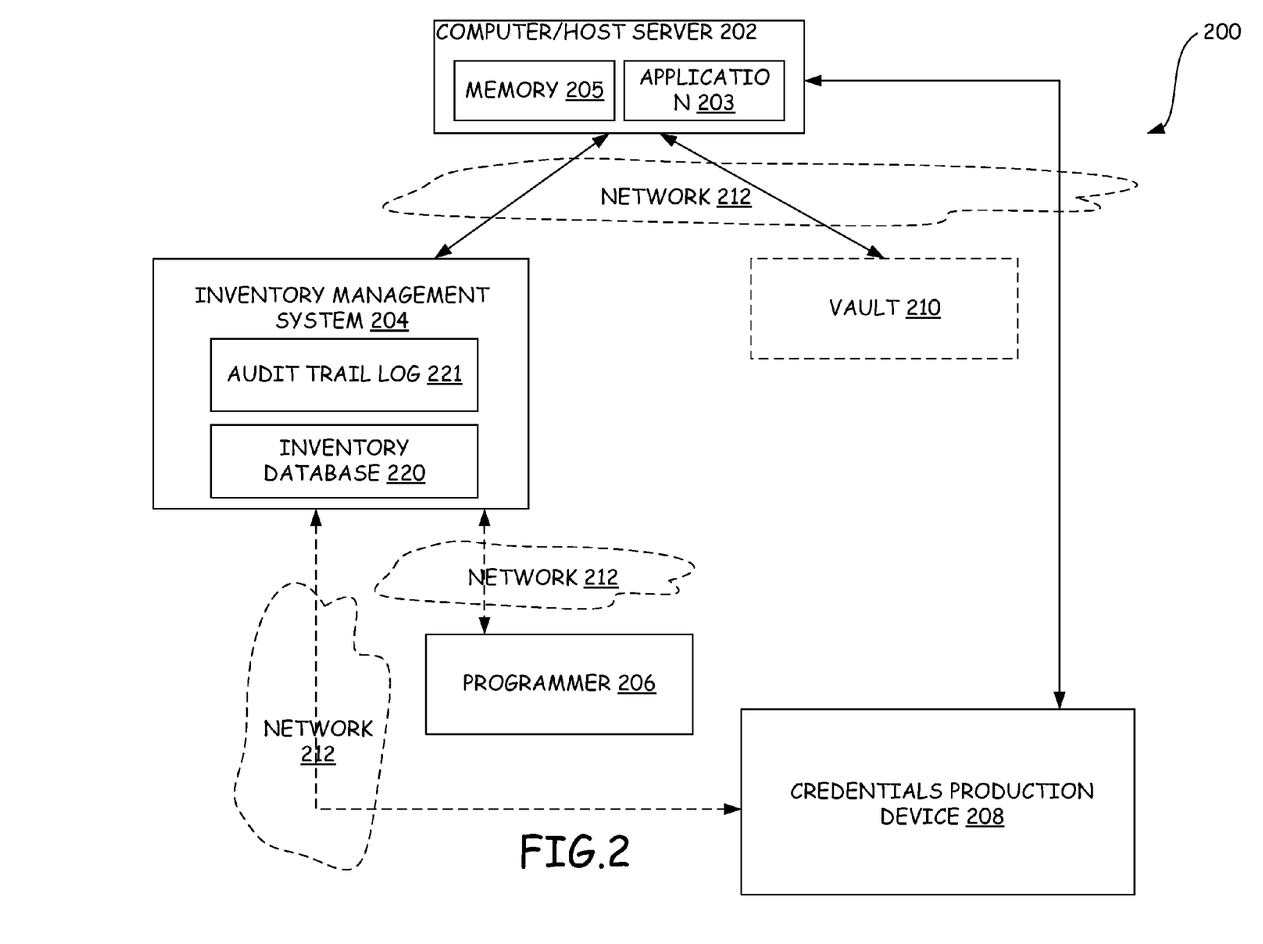
FIG. 2 is a schematic diagram of an exemplary credential production system.

FIG. 2 is a schematic diagram of an exemplary credential production system 200 in accordance with embodiments of the present invention. System 200 includes a computer or host server 202, an inventory management system (IMS) 204, a programmer 206 and a credentials production device 208. Computer/host server 202 includes a credential processing application 203 that generates and stores credential processing jobs in a memory 205. The credential processing jobs include processing instructions for processing a credential substrate and are communicated to credential production device 208.

Inventory management system 204 is coupleable to computer/host server 202 and is configured to track consumable supplies based on inventory location and process states. In one embodiment, IMS 204 can be stored in a computer-readable medium that is located remotely from, but accessible by computer/host server 202. In another embodiment, computer/host server 202 includes IMS 204. Credentials production device 208 is coupleable to computer/host server 202 and inventory management system 204. Credential production device 208 is configured to process a credential substrate (e.g. card substrates, paper substrates, plastic substrates, substrates used to form passports and other valuable substrate documents) by using at least one consumable supply to perform at least one step in forming a credential (e.g. identification card, passport, employee badge and etc.). Exemplary credential production devices include printing devices (e.g. printers and etc.) for printing images to the credential substrate, laminating devices for laminating an overlaminate to the credential substrate and encoding devices for encoding data (e.g. writing a barcode, recording data to a magnetic stripe, writing data in a memory chip and etc.) to the credential substrate. Programmer 206 is coupleable to IMS 204 and is configured to encode data to a programmable memory in the consumable supply. Credential production system 200 can also optionally include a secured storage 210. Secured storage 210 is coupleable to computer/host server 202 and is configured to receive and store consumable supplies for use in processing credential substrates.

In one embodiment and as illustrated in dashed lines in FIG. 2, computer/host server 202 can communicate with IMS 204, credential production device 208 and vault 210 over a network 212, such as an internet or intranet. In such an embodiment, computer/host server 202 can be remotely located from IMS 204, programmer 206, credential production device 208 and secured storage 210. In another embodiment, computer/host server 202 can communicate with IMS 204, credential production device 208 and secured storage 210 directly using conventional methods such as including a physical communication link (i.e. cable connection such as, for example, a Universal Serial Bus) or a wireless communication link (such as, for example infrared or radio frequency). In such an embodiment, computer/host server 202 is located in proximity to IMS 204, programmer 206, credentials production device 208 and secured storage 210. In other embodiments, programmer 206, credentials production device 208 and secured storage 210 can be located remotely from IMS 204 and computer/host server 202 via network 212. In still other embodiments, IMS 204 can be located remotely from computer/host server 202 and remotely located from programmer 206, credentials production device 208 and secured storage 210 via network 212. It should be noted that although FIG. 2 illustrates a single computer/host server 202, it should be understood that the present invention can include more than one computer/host server to be used to control and run different components of credential production system 200. Components of credential production system 200 will be discussed in more detail with respect to FIGS. 3-4

Figure 3:
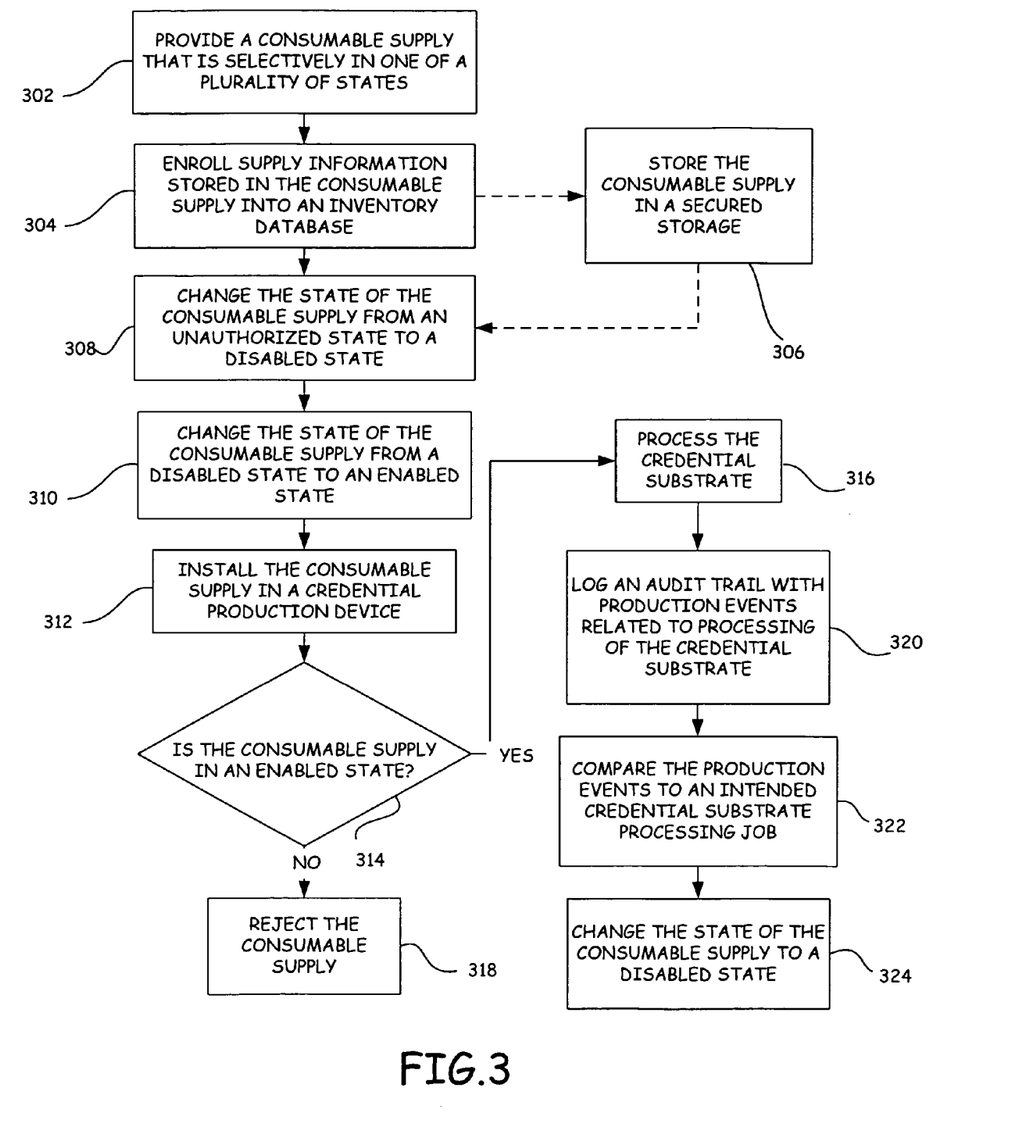
FIG. 3 is a flowchart illustrating a method of securely processing a credential substrate using a credential production system.
Figure 4:
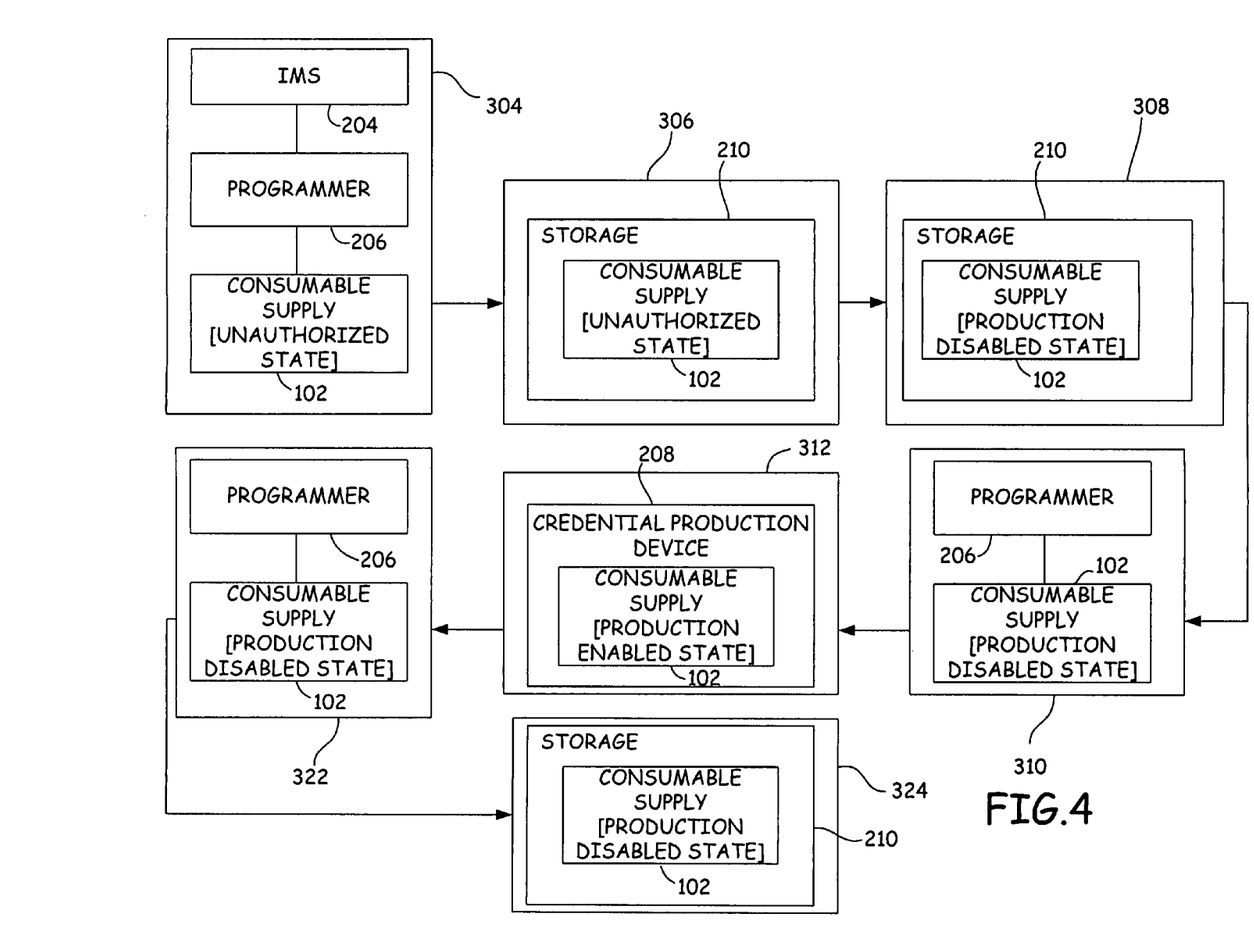
FIG. 4 illustrates a schematic diagram to graphically illustrate process steps of the flowchart illustrated in FIG. 3.

FIG. 3 illustrates a flowchart 300 illustrating a method of securely processing a credential substrate using a consumable supply in accordance with the present invention. To better illustrate the process steps illustrated in FIG. 3, FIG. 4 is provided. FIG. 4 illustrates a schematic flow diagram 400 of consumable supply 102, illustrated in detail in FIG. 1, as it proceeds through the method of processing a credential substrate illustrated in FIG. 3. It should be noted that process steps or blocks are labeled in FIG. 4 that correspond with the process steps or blocks in FIG. 3.

At block 302 of FIG. 3, a consumable supply 102 (FIGS. 1 and 4) is provided that is selectively in one of a plurality of states. Consumable supply 102 is provided along with other consumable supplies at an issuance location. The issuance location can be a dealer of secure consumable supplies or local to the customer. Each provided secure consumable supply includes programmable memory 104 (FIG. 1). Consumable supply 102 can include an unauthorized state, a production disabled state and a production enabled state. An unauthorized state is a state at which consumable supply 102 has not yet been authorized for use in production of a credential substrate. Both production disabled state and production enabled state are states which consumable supply 102 has been authorized to be used in production of a credential substrate. When consumable supply 102 is initially provided to credential production system 200, it is in an unauthorized state as illustrated in block 304 of FIG. 4.

To use consumable supply 102 with credential production device 208 (FIG. 2), an operator needs to enroll supply information located in programmable memory 104 (FIG. 1) into an inventory database 220 (FIG. 2) of IMS 204. At block 304 of FIGS. 3 and 4, supply information stored in programmable memory 104 (FIG. 1) is enrolled into IMS 204. Inventory database 220 includes fields for storing supply information examples of which were discussed with respect to FIG. 1. Additional fields can be added into inventory database 120 by IMS 104. These additional fields can include a date/time stamp, operator identification and etc.

To enroll supply information, IMS 204 performs a security check to verify that the operator enrolling supply information from consumable supply 102 is authorized to do so. The security check or log-in process is accomplished by validating the identity of the operator. Example techniques for validating an operator includes validating a username and password, validating a biometric such as a fingerprint, and validating a scanned identification card in combination with validating a personal identification number (PIN) or biometric. After the security check, the operator places consumable supply 102 on programmer 206 illustrated in FIGS. 2 and 4. Like IMS 204, programmer 206 can also perform a security check on the operator. The security check is accomplished by validating the identity of the operator using similar techniques to those described above in relation to IMS 204. In addition, programmer 106 can be configured to operate only with consumable supplies that contain proper security codes, security keys or encryption keys. Programmer 206 retrieves the supply information by reading programmable memory 104 (FIG. 1). IMS 204 receives the supply information and automatically populates inventory database 220 to enroll consumable supply 102. Although FIG. 2 illustrates programmer 206 as reading supply information from programmable memory 104 (FIG. 1), it should be understood that a different programmer, only for the purpose of reading supply information in consumable supplies, can be used. In addition, as illustrated in FIG. 4, during the enrollment process, consumable supply 102 remains in an unauthorized state.

After supply information has been populated into inventory database 220 to enroll consumable supply 102 into IMS 204, consumable supply 102 can optionally be stored in secured storage 210 (FIG. 2) by an operator as illustrated in block 306 in FIGS. 3 and 4. To store consumable supply 102 in secured vault 210, a security check can be performed on the operator to validate the identity of the operator. The operator is granted access to place consumable supply 102 into secured storage 210 and retrieve consumable supply 102 from secure storage 210 upon validation. Example techniques for validating the identity of the operator are similar to those techniques employed in logging into IMS 204 and using programmer 206. After access is granted, secured storage 210 receives consumable supply 102 from the operator. Consumable supply 102 remains in an unauthorized state after it is stored in securable storage 210 and enrolled in IMS 204. It should be noted that secured storage 210 is an optional component of credential production system 200. It is possible for the operator to store consumable materials on an open shelf. Many times consumable supplies located in secured storage 210 can not yet be used with a credential production device because they do not include the proper process state.

Figure 5:
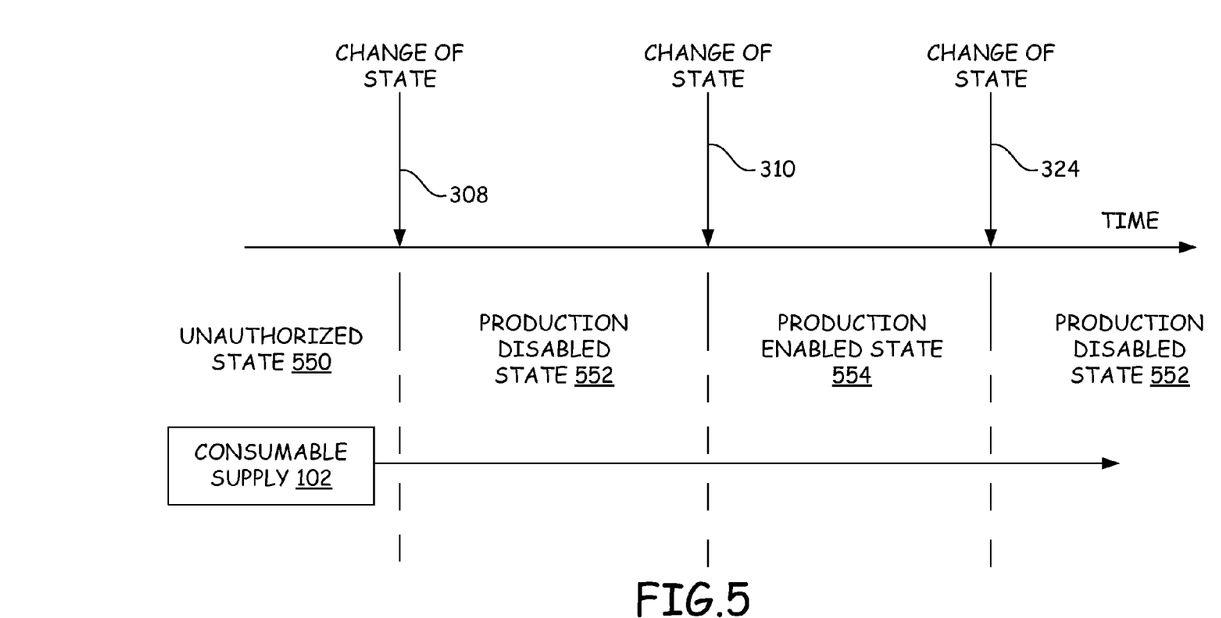
FIGS. 5 and 6 are simplified diagrams of various process states of a consumable supply over time.
Figure 6:
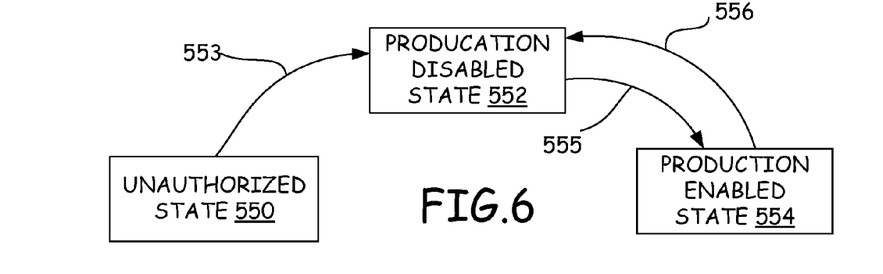

At block 308, the state of consumable supply 102 is changed from an unauthorized state to a production disabled state. Changing the state of consumable supply 102 from an unauthorized state to a production disabled state is necessary to later advance the consumable supply into a production enabled state. FIGS. 5 and 6 show more detailed diagrams of the plurality of process states of which consumable supply 102 can be in throughout the process of being used to form a credential. In FIGS. 5 and 6, consumable supply 102 begins in an unauthorized state 550. Unauthorized state 550 is the state at which consumable supply 102 enters the issuance location to be enrolled in IMS 204. Line 308 of FIG. 5 corresponds with block 308 of FIGS. 3 and 4. At line or block 308, the process state of consumable supply 102 changes from unauthorized state 550 to a production disabled state 552. After consumable supply 102 changes to a production disabled state, the consumable supply will never return to the unauthorized state as illustrated by arrow 553 in the diagram of FIG. 6.

In one embodiment, to change the state of consumable supply 102 from an unauthorized state to a production disabled state, IMS 204 first performs a security check on an operator to validate the identity of an operator. After attaining access, the operator locally changes the state record in inventory database 220 from an unauthorized state to a production disabled state. In another embodiment, the process state of consumable supply 102 can be remotely changed in inventory database 220 by computer/host server 202. For example, if an issuance location has a quantity of 100 consumable supplies that are loaded in IMS 204, a registered operator with privileges to change the process state of consumable supplies can remotely advance or locally advance (via computer/host server 202) any or all of the 100 secure cartridges from an unauthorized state to a production disabled state. Advancing a limited amount of consumable supplies to a production disabled state controls production without putting significant quantities of consumable supplies at risk of a security breach.

After consumable supply 102 is changed to a production disabled state, the consumable supply is authorized for use in processing of a credential substrate. At block 310, the state of consumable supply 102 is changed from a production disabled state to a production enabled state. Changing the state of consumable supply 102 from a production disabled state to a production enabled state is necessary to use the consumable supply with credential production device 208. In FIG. 5, line 310 corresponds with block 310 of FIGS. 3 and 4. At line or block 310, the process state of consumable supply 102 changes from production disabled state 552 to a production enabled state 554. This change of process state is also indicated in FIG. 6 by arrow 555.

When utilizing secured storage, an operator unlocks the secured storage through a security check (as previously discussed) to change consumable supply 102 from a production disabled state to a production enabled state. The operator removes consumable supply 102 and uses programmer 206 to encode a production enabled state on programmable memory 104 (FIG. 1). The production enabled state can be enabled for a unique credential production device. As previously discussed, consumable supply can be changed to a production enabled state if the consumable supply has been changed from an unauthorized state to a production disabled state. Using the example discussed above, if 10 of the 100 consumable supplies that are loaded into IMS 104 are advanced into a production disabled state, then those 10 consumable supplies can be selected to be changed to a production enabled state. If an operator attempts to change the state of the $11^{th}$ consumable supply, then programmer 106 will inform the operator that the $11^{th}$ consumable supply can not be changed to a production enabled state.

At block 312 of FIGS. 3 and 4, consumable supply (having a production enabled state) is installed in credential production device 208. The installed consumable supply 102 will be used to process the credential substrate. To install consumable supply 102 in credential production device 208, a security check is performed to validate the identity of an operator. The operator is granted access to install consumable supply 102 into credential production device 208 upon validation. Example techniques for validating the identity of the operator are similar to the techniques employed in logging into IMS 104 and accessing secure storage 210. In one embodiment, IMS 204 can interrogate credential production device 208 via computer/host server 102 to determine what consumable supply is being installed. In another embodiment, credential production device 208 can send supply information to IMS 204 that is stored in memory 104 of consumable supply 102.

At block 314 of FIG. 3, credential production device 208 verifies that consumable supply 102 includes a production enabled state. If consumable supply 102 is production enabled, the method proceeds to block 316 and processes a credential substrate. If consumable supply 102 is not in a production enabled state, the method proceeds to block 318 and rejects consumable supply 102 for use in processing a credential substrate.

Figure 7:
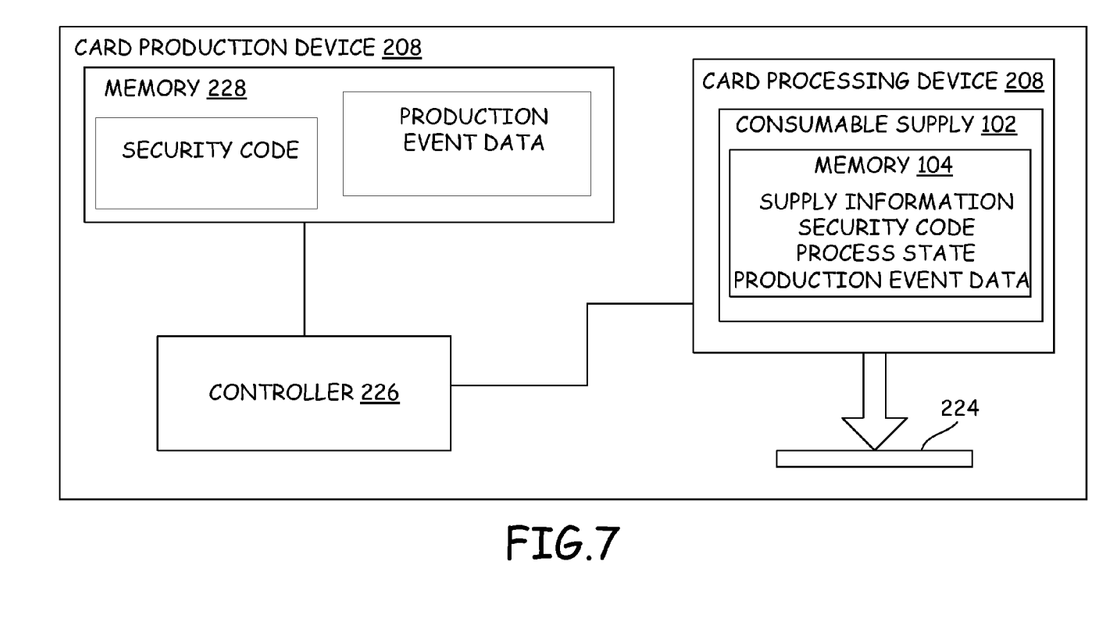
FIG. 7 illustrates a block diagram of a credential production device.

FIG. 7 illustrates a more detailed block diagram of credential production device 208 in accordance with the present invention. Credential production device 208 includes at least one credential substrate processing device 222 that is configured to process credential substrate 102 in response to a credential processing job received from computer/server 202 (FIG. 2). Exemplary credential substrate processing devices 222 include, for example, credential substrate printing devices (e.g. inkjet or thermal printhead) for printing images to a credential substrate 224, credential substrate laminating devices for laminating an overlaminate to credential substrate 224 and credential substrate encoding device for encoding data to substrate 224. Many automated and Manual methods can be used to add security labels. The methods of encoding data include writing barcode on the substrate, recording data to a magnetic stripe of the substrate, encoding data in a memory chip of the substrate and other data encoding methods.

Credential production device 208 illustrated in FIG. 7 also includes an installed consumable supply 102 having programmable memory 104. A controller 226 of credential production device 208 is generally configured to process the credential substrate 224 using credential processing device 222 in response to the credential processing job generated by computer/host server 202 (FIG. 2). For example, a credential processing job for processing card substrate 224 can include instructions for printing a photograph and personal information in accordance with a predefined layout. Additional exemplary instructions include laminating instructions for a laminating processing device to apply an overlaminate to a surface of substrate 224, flipping instructions for flipping or rotating substrate 224, encoding instructions to encode data to substrate 224 and other processing instructions for credential production device 202.

Besides allowing credential production device 208 to operate if memory 104 (FIG. 1) of consumable supply 102 is properly encoded with a production enabled state, credential production device 208, in one embodiment, can require that consumable supply 102 have a positive count of remaining consumable material. Such a count can be stored in memory 104 (FIG. 1). In another embodiment, credential production device 208 can also require that consumable supply 102 have a security code stored in memory 104 that corresponds with a security code stored in memory 228 of credential production device 208. A security code can be a generic code or customer-specific code that is used to limit the consumable supply to be used with a specific credential production device. For example, memory 104 of consumable supply 102 can include a security code that is encrypted. The security code can also be used for other purposes then just as a security barrier. For example, the security code can be encrypted exchange information to be decrypted by production device 208. In response to an operator attempting to install consumable supply 102, credential production device 208 can decrypt the security code and compare it to the security code located in memory 228 of credential production device 208. The security code can be derived from, for example, the serial number of memory 104 of consumable supply 102, an identifier of a current process step within the credential production process, a count of remaining consumable material or consumed consumable material in the consumable supply 102 (e.g. remaining prints, remaining application of overlaminate, remaining substrate) or other value.

During processing of credential substrate 224, many production events or production event data can be recorded in memory 104 of consumable supply 102 or in a memory 228 of credential production device 208. These production events are logged into an audit trail log 221 of IMS 204 as illustrated in block 320 of FIG. 3. Exemplary production event data logged into audit trail log 221 include, for example, a document production job identifier (e.g. a job number), a time/date of the process event, an operator of credential production device 208, a substrate identifier (e.g. a serial number of a document substrate), an image component of the job (e.g. an image file corresponding to an image printed to the substrate), a scanned image, data encoded to the substrate, textual data printed to the substrate, an identification of the secure material in the credential production process, an identification of the image panel or panels used to print an image to the substrate and other data regarding the credential production process. In addition, other production events can also be stored in programmable memory 104 of consumable supply 102 or in memory 228 of credential production device 208 regarding the handling of the consumable supply and can be loaded and logged in audit trail log 221. Examples include operator identifiers and corresponding dates and times of who stored and removed the consumable supply from secured storage 210, installed consumable supply 102 in credential production device 208 and other operator initiated production events. Credential production device 208 can also update the count of consumed or remaining consumable material in the memory of the consumable supply. Production event data can be communicated from credential production device 208 to IMS 204 via computer/host server 202 as illustrated in FIG. 2. Production event data can be communicated to IMS 204 from consumable supply 102 via programmer 206 reading and transferring the data.

If the count of remaining consumable in consumable supply 102 is not a positive count, then credential production device 208 flags the consumable supply 102 for destruction. For example, credential production device 208 can store a "ready for destruction" event in memory 104 of consumable supply 102 or in memory 228. IMS 204 provides a separate functionality for tracking and managing the destruction of consumable materials. In one embodiment, a security check, such as those described above for logging into IMS 204, accessing secured storage 210 and installing consumable supply 102 in credential production device 208, can authorize an operator to destroy the consumable material. In one embodiment, authorized operators verify the process using electronic signatures. In another embodiment, the destruction device (e.g. an incinerator) includes a secure bin in which the consumable material is loaded just prior to destruction. The memory of the consumable material is read and provided to IMS 204 to indicate that it will soon be or has been destroyed. The destruction event is logged into audit trail log 224 along with an identification of the operator of the destructed device.

At block 322 of FIG. 3, computer/host server 202 (FIG. 2) is configured to verify that the processing of the card substrate corresponds with the intended processing of the card substrate. To verify that the card substrate was correctly processed, computer/host server 102 compares the production events logged in audit trail log 221 to the generated credential processing job that was originally sent to credential production device 208.

After processing the credential substrate using consumable supply 102 and credential production device 208, an operator removes the consumable supply from the credential production device. At block 324 of FIGS. 3 and 4, the operator uses programmer 206 (FIG. 2) to read information stored in memory 104, such as production events and a count of remaining consumable material in consumable supply 102. Programmer 206 loads information to IMS 204. Also at block 324, programmer 206 changes the process state of consumable supply 102 from the production enabled state to a production disabled state. Such a change will disable any further use of consumable supply 102 with credential production device 208 until the consumable supply is encoded as production enabled. In FIG. 5, line 324 corresponds with block 324 of FIGS. 3 and 4. At line or block 324, the process state of consumable supply 102 changes from production enabled state 554 to a production disabled state 552. This change of process state is also indicated in FIG. 6 at arrow 556.

After the process state of consumable supply 102 has been changed back to a disabled state, the consumable supply 202 can be placed back into secure storage 210. This step is illustrated in block 324 of FIG. 4. After storing consumable supply 102 in secured storage 210, IMS 204 can verify that the consumed or remaining count of consumable supply matches values that are stored in inventory database 220.

Although the present invention has been described with reference to preferred embodiments, workers skilled in the art will recognize that changes may be made in form and detail without departing from the spirit and scope of the invention.

What is claimed is:

1. A consumable supply comprising:
   a consumable material for use in forming a credential product selected from a group consisting of print ribbon cartridges, ink cartridges, substrates and overlaminate; and
   a programmable memory selectively encoded to indicate whether the consumable material can be consumed by a credential production device to form the credential product, wherein the consumable supply is usable with a credential production device when the memory indicates a production enabled state and is prevented from use with the credential production device when the memory indicates a production disabled state, the selective encoding of one of the production enabled state and the production disabled state being independent of an amount of consumable material in the consumable supply.

2. The consumable supply of claim 1, wherein the programmable memory includes a security code that limits the use of the consumable supply with a credential production device that includes a corresponding security code.

3. The consumable supply of claim 1, wherein the programmable memory includes production event data related to forming the credential product with the consumable supply and handling of the consumable supply.

4. The consumable supply of claim 3, wherein the production event data is indicative of one of an amount of remaining consumable material or an amount of consumable material consumed.

5. A credential production system comprising:
   a consumable supply including a programmable memory, the programmable memory selectively encoded to indicate a production enabled state and a production disabled state to specify whether the consumable supply selected from a group consisting of print ribbon cartridges, ink cartridges, substrates and overlaminates can be consumed for forming a credential product, the selective encoding of one of the production enabled state and the production disabled state being independent of an amount of consumable material in the consumable supply;
   a credential production device comprising:
      a credential processing device configured to process the credential substrate using the consumable supply, wherein the credential processing device is selected from a group consisting of a printing device and a laminating device; and
      a controller configured to:
         read the programmable memory of the consumable supply;
         process a credential substrate using the credential processing device and the consumable supply when the programmable memory of the consumable supply indicates the production enabled state; and
         prevent the processing of the credential substrate using the consumable supply when the programmable memory of the consumable supply indicates the production disabled state.

6. The credential production system of claim 5, wherein the consumable supply includes an unauthorized state in which the consumable supply can not be encoded to indicate the production enabled state.

7. The credential production system of claim 5, wherein the consumable supply includes an authorized state in which the consumable supply can be encoded to indicate the production enabled state.

8. The credential production system of claim 5, further comprising a programmer configured to selectively encode the programmable memory of the consumable supply with the production enabled state and the production disabled state.

9. The credential production system of claim 5, further comprising an inventory management system including an inventory database, the inventory management system configured to enroll supply information from the consumable supply into the inventory database.

10. The credential production system of claim 9, wherein the inventory management system further comprises an audit trail log configured to log production event information stored in one of the programmable memory of the consumable supply and a memory of the credential production device.

11. A method of securely processing a credential substrate using a credential production system, the method comprising:
   providing a consumable supply including a consumable material and a programmable memory, the programmable memory selectively indicative of one of a plurality of states including a production enabled state and a production disabled state, the selective indication of one of the production enabled state and the production disabled state being independent of an amount of consumable material in the consumable supply;
   changing the state of the programmable memory from the production disabled state to the production enabled state;
   verifying that the state of the consumable supply is in the production enabled state; and
   processing the credential substrate using the consumable material of the consumable supply if the programmable memory is in the production enabled state.

12. The method of claim 11, further comprising verifying that an operator is authorized to change the state by performing a security check on an operator prior to changing the process state of the consumable supply.

13. The method of claim 11, wherein:
   the states of the consumable supply include an unauthorized state; and
   the changing of the state of the consumable supply includes changing the state from the unauthorized state to the production disabled state prior to changing the state from the production disabled state to the production enabled state.

14. The method of claim 13, further comprising preventing the changing of the state of the consumable supply from an unauthorized state to a production enabled state.

15. The method of claim 11, further comprising changing the state of the consumable supply from the production enabled state to the production disabled state after processing the credential substrate using the consumable supply.

16. The method of claim 11, further comprising enrolling supply information stored in the consumable supply into an inventory database.

17. The method of claim 11, further comprising installing the consumable supply in a credential production device after the consumable supply is changed to the production enabled state.

18. The method of claim 11, further comprising logging an audit trail log with production event information related to processing of the credential substrate.

19. The method of claim 18, further comprising comparing the production event information to an intended credential substrate processing job.

\* \* \* \* \*

UNITED STATES PATENT AND TRADEMARK OFFICE
CERTIFICATE OF CORRECTION

PATENT NO. : 7,620,815 B2  Page 1 of 1
APPLICATION NO. : 11/261450
DATED : November 17, 2009
INVENTOR(S) : Fontanella et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 384 days.

Signed and Sealed this

Fourteenth Day of December, 2010

David J. Kappos
*Director of the United States Patent and Trademark Office*